United States Patent [19]

Miller

[11] Patent Number: 5,011,374
[45] Date of Patent: Apr. 30, 1991

[54] METHOD AND APPARATUS FOR BALANCING TURBINE ROTORS

[75] Inventor: Michael L. Miller, Westchester, Ohio

[73] Assignee: General Electric Company, Cincinnati, Ohio

[21] Appl. No.: 437,318

[22] Filed: Nov. 17, 1989

Related U.S. Application Data

[63] Continuation of Ser. No. 121,710, Nov. 17, 1987, abandoned.

[51] Int. Cl.⁵ .......................................... F04D 29/66
[52] U.S. Cl. ................... 416/144; 74/573 R; 73/468
[58] Field of Search ............... 416/144, 80, 145, 190, 416/192, 189 R, 500; 74/573 R; 188/378; 60/39, 75; 73/455, 468

[56] References Cited

U.S. PATENT DOCUMENTS

| | | | |
|---|---|---|---|
| 1,378,464 | 5/1921 | Junggren | 416/190 |
| 2,366,795 | 1/1945 | Lamoreaux | 416/144 X |
| 2,610,823 | 9/1952 | Knowlton | 416/190 |
| 2,771,240 | 11/1956 | Gurin | 416/190 |
| 3,051,279 | 8/1962 | Hougen | 416/DIG. 3 |
| 3,297,302 | 1/1967 | Spears | 416/144 |
| 3,304,053 | 2/1967 | Pagluica | 416/145 |
| 3,315,750 | 4/1967 | Delaney | 416/144 |
| 3,687,244 | 8/1972 | Hillegass et al. | 416/144 X |
| 4,025,231 | 5/1977 | Kochevar et al. | 416/144 |
| 4,177,011 | 12/1979 | Eskesen et al. | 416/190 X |
| 4,776,763 | 10/1988 | Light | 416/144 |
| 4,803,893 | 2/1989 | Bachinski | 416/144 X |
| 4,817,455 | 4/1989 | Buxe | 416/144 X |
| 4,842,485 | 6/1989 | Barber | 416/144 |

FOREIGN PATENT DOCUMENTS

| | | | |
|---|---|---|---|
| 29506 | 3/1977 | Japan | 416/190 |
| 35506 | 4/1979 | Japan | 416/144 |
| 112006 | 9/1979 | Japan | 416/144 |
| 14803 | 2/1981 | Japan | 416/190 |
| 787689 | 12/1980 | U.S.S.R. | 416/192 |
| 861662 | 9/1981 | U.S.S.R. | 416/190 |
| 805371 | 12/1958 | United Kingdom | 416/144 |
| 1509185 | 5/1978 | United Kingdom | 416/190 |
| 2004624 | 4/1979 | United Kingdom | 416/144 |

Primary Examiner—John T. Kwon
Attorney, Agent, or Firm—Jerome C. Squillaro

[57] ABSTRACT

A method and apparatus for balancing the rotor in the low pressure stage of the turbine in a jet engine comprises attaching at least one balance clip to the shroud of the rotor. The balance clip comprises a clip body formed with a forward hook portion adapted to extend over the forward rail of the shroud and an aft tab which is crimped over the aft rail of the shroud onto its outer surface so that the clip body is retained against the interior face or diameter of the shroud. The balance clip is formed of sheet material such as AMS 5596E/5597B whose weight can be varied by altering the thickness or width of the clip body, or by drilling holes in the clip body to remove material therefrom.

30 Claims, 2 Drawing Sheets

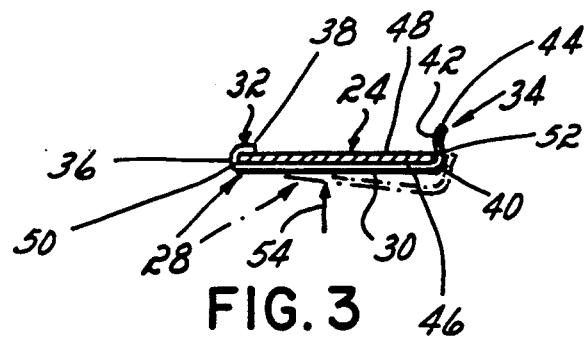
FIG. 3
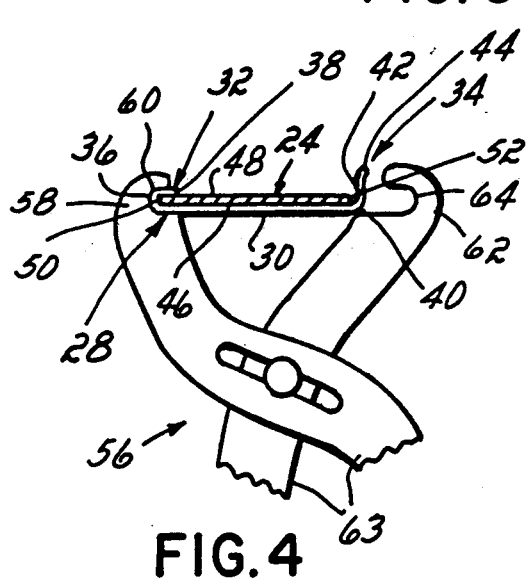
FIG. 4
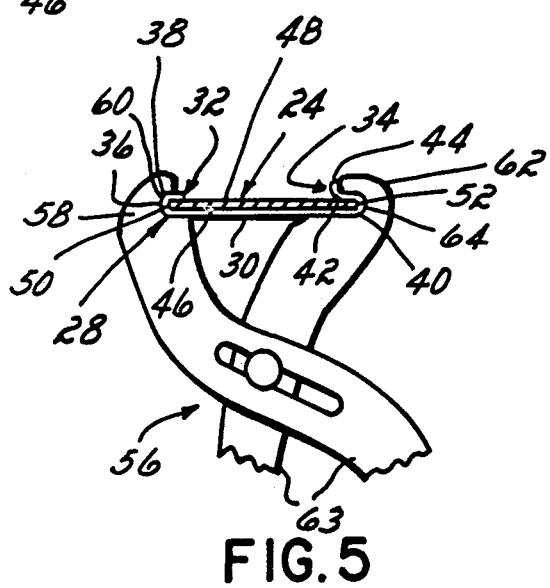
FIG. 5
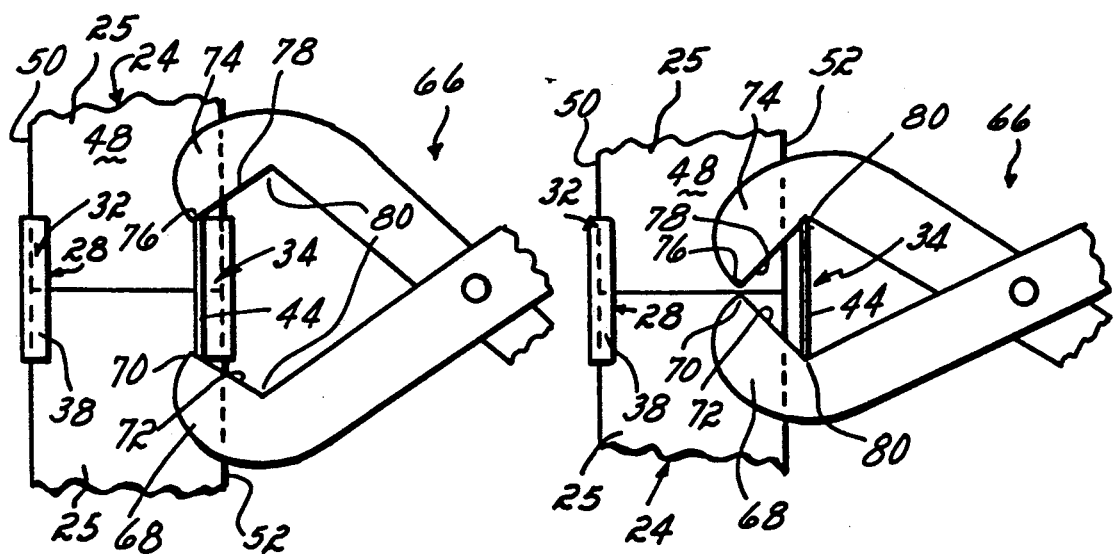
FIG. 6
FIG. 7

METHOD AND APPARATUS FOR BALANCING TURBINE ROTORS

This is a continuation of application Ser. No. 07/121,710, filed Nov. 17, 1987, now abandoned.

FIELD OF THE INVENTION

This invention relates to the balancing of turbine rotors in jet engines, and, more particularly, to a balance clip adapted to mount to the tip shroud of selected rotor blades in the low pressure turbine rotor of a jet engine for balancing the rotor.

BACKGROUND OF THE INVENTION

The turbine of a jet engine provides the power necessary to drive the compressor and accessories, and, in engines which do not make use solely of a jet for propulsion, the turbine provides the power to drive the shaft of a propeller or rotor. Energy produced from the continuous flow of hot gases released by the combustion system of the engine is extracted by the turbine which expands the gases to lower pressure and temperature. In order to produce the driving torque required in the jet engine, turbines normally consist of several stages. Each stage of the turbine employs one row of stationary nozzle guide vanes fixedly mounted to the turbine case, and a rotor which includes a row of rotor blades circumferentially mounted to a rotating turbine disk. The turbine disk is either formed integrally with or is bolted to a turbine shaft.

The blades in the rotor of the turbine each have a blade root adapted to mount to the turbine disk and an airfoil extending radially outwardly from the root which terminates at a blade tip. In many jet engines, the low pressure stage rotor is formed with a shroud which comprises separate segments or tip shrouds mounted at the tip of each rotor blade.

In view of the high rotational speeds of the turbine rotor blades and the mass of the materials which form the blades, proper balancing of the rotors of the turbine is extremely important. Any unbalance can seriously affect the rotating assembly bearings and engine operation.

Conventionally, balancing of the rotor in the low pressure stage of the turbine has been performed in one or two different ways. In one method, weights are bolted to the aft flange of the last stage low pressure turbine disk at one or more locations about its circumference. Each weight produces a moment about the center of rotation of the turbine disk which is the product of the mass of the weight and its distance from the center of rotation. The number, position and mass of the weights are determined by conventional balance testing of the turbine to achieve the desired balancing of the rotor.

One problem with this method is that a relatively large amount of weight is often needed on the aft flange of the turbine disk in order to balance the rotor. This is because the radius or moment arm between the center of rotation of the turbine disk and its aft flange is small. In order to increase the moment produced by the weight over such a short moment arm, the magnitude of the weight must be substantial.

Another problem with mounting balance weights to the aft flange of the turbine disk is that the relatively small radius between the center of rotation of the turbine disk and its aft flange makes it difficult to accurately mount the weights on the aft flange at the desired angular position relative to the center of rotation of the disk. This is particularly true for relatively small angular adjustments, e.g., 1° or 2°, wherein the weights can be moved only a very small distance along the circumference of the aft flange to produce the desired angular adjustment relative to the center of rotation of the turbine disk.

Additionally, last stage low pressure turbine disks may not be originally designed with an aft flange and one must be machined into the disk to employ this method of balancing. This machining operation greatly increases the cost of manufacture of the turbine disk and may result in a waste of money where the rotor does not need balancing because the aft flange serves no other function except for use in balancing the rotor.

A second method of trim balancing the last stage low pressure turbine rotor has been to wrap a thin wire about the airfoil of the rotor blade. Typically, the wire is initially wrapped around the root of the blade where it is connected to the turbine disk, but during operation of the engine the wire tends to slide radially outwardly along the airfoil due to the centrifugal force produced by rotation of the blade. This forces the wire against the tip shroud at the radially outermost end of the airfoil of the rotor blade, or somewhere along the airfoil of the blade.

One problem with the use of such wires to balance the rotor is that they tend to fatigue and break away from the rotor blades after a period of engine operation. Movement of the wires along the airfoil of the blades at different operational speeds weakens the wires and often causes them to detach from the blades. Additionally, even if the wires remain attached to the blades, some of the wires can become hung up at various locations which can result in unbalance of the rotor.

A problem common to both of the methods of rotor balancing described above is that the installation of either weights or wires require disassembly of at least a portion of the aft end of the engine. This adds substantially to the time and cost involved in balancing the turbine rotor blades.

SUMMARY OF THE INVENTION

It is therefore among the objectives of this invention to provide a method and apparatus for balancing the rotor in a low pressure stage of the turbine of a jet engine which reduces the time and cost of balancing the rotor, which increases the accuracy of the rotor balancing and which requires a minimum amount of weight to obtain the desired balance.

These objectives are accomplished by means of at least one balance clip which is mounted on the inner diameter or inside face of the rotor shroud between adjacent airfoils of the rotor. The balance clip can be installed on the shroud between selected airfoils of the rotor without disassembly of the aft portion of the engine. In addition, less weight is required at the tip of the rotor blades to effect balancing of the rotor, and accurate placement of the clip can be obtained, because of the relatively long radius or moment arm between the center of rotation of the turbine disk and the tip of the airfoil of the rotor blade.

In the presently preferred embodiment, the balance clip is formed of a thin, sheet-like section of wrought material having a thickness of approximately 10 millimeters. The balance clip comprises a generally planar clip body having a forward end and an aft end. A U- shaped forward tab or hook is formed on the forward end of the clip body and an upright, aft tab is formed on its aft end. Preferably, the outwardly extending end of the aft tab is formed with a bend.

The balance clip herein is installed on the shroud of the rotor between adjacent airfoils with a minimum of effort and without requiring disassembly of the aft section of the engine. In the presently preferred embodiment, a tool such as a needlenose pliers is employed to grasp the edges of the clip body and position the forward hook of the balance clip onto the forward rail of the shroud at the tip of the turbine blade. A screwdriver or similar tool is then placed against the clip body to push it into engagement with the inner face or inside diameter of the shroud. In the process of pushing the clip body against the shroud, the aft tab of the balance clip engages the aft rail of the shroud and is sprung outwardly in the aft direction so that the balance clip snap fits onto the shroud in position for the next step in the installation operation.

A modified channel lock tool is employed in the next step of the installation operation. The channel locks tool comprises opposed jaws, one of which is formed with a slot or recess adapted to fit onto the forward hook of the balance clip and the other of which is formed with a recess adapted to engage the aft tab. The jaws of the channel lock are first opened to engage the forward hook and aft tab, and then moved toward one another to bend or crimp the aft tab over the aft rail of the shroud and onto its outside diameter or face. In this position, the bend at the outer end of the aft tab causes the outermost edge of the aft tab to extend above the outer face of the shroud to facilitate removal of the balance clip as described below.

Balancing of the rotor in the low pressure stage of the turbine of a jet engine with the balance clip of this invention is performed in a relatively short period of time without requiring disassembly of the aft section of the engine. The weight of the balance clips is easily varied by increasing the width or thickness of the clip body to increase the weight, or by drilling holes in the clip body to reduce the weight. It is contemplated that the overall weight of the balance clips herein will be much less than that required of prior art weights bolted to the aft flange of the turbine disk. This is because the radius or moment arm between the center of the turbine disk and tip of the rotor blade is much greater than the moment arm between the center of the turbine disk and its aft flange. Since the moment produced by a balancing weight is the product of the moment arm and the mass of the weight, a longer moment arm permits the use of a smaller weight to produce the same moment.

Additionally, the relatively long radius between the center of rotation of the turbine disk and the rotor blade tip permits more accurate adjustment of the angular position of the weight relative to the center of rotation than in the prior art method employing weights mounted to the aft flange of the turbine disk. This is particularly true of small angular adjustments, i.e., it is more difficult to accurately adjust the position of a weight over an angle of 1° or 2° relative to the center of rotation of the turbine disk where the weight is located at a relatively short radius from the center, as compared to adjustment of the position of a weight located at a much longer radius.

The balance clips of this invention are securely mounted to the shroud of the rotor and do not dislodge during operation of the engine even at high torque. If for some reason a balance clip must be removed, the disassembly operation is also easily performed. A removal tool is provided having opposed jaws each formed with a cam surface which diverge relative to one another from the tip of the jaws rearwardly toward the handle of the tool. In order to remove a balance clip herein, the jaws of the removal tool are placed on the outer surface of the shroud so that their tips engage the aft tab of the balance clip at the bend in its outer end. The jaws are then moved toward one another so that their cam surfaces force the aft tab radially outwardly from the outer surface of the shroud. A conventional pair of pliers may then be used to pull the aft tab and the remainder of the balance clip off of the shroud.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 3 is a side view of the balance clip in the initial stage of installation on the shroud of the rotor;

FIG. 4 is a view similar to FIG. 3 with the channel lock installation tool in position to crimp the aft tab of the balance clip;

FIG. 5 is a view similar to FIG. 4 with the aft tab in the crimped position;

FIG. 6 is a plan view of the disassembly tool herein in position preparatory to bending the aft tab of the balance clip upwardly from the shroud; and FIG. 7 is a view similar to FIG. 6 with the jaws of the removal tool closed and the aft tab bent upwardly from the surface of the shroud.

DETAILED DESCRIPTION OF THE INVENTION

Figure 1:
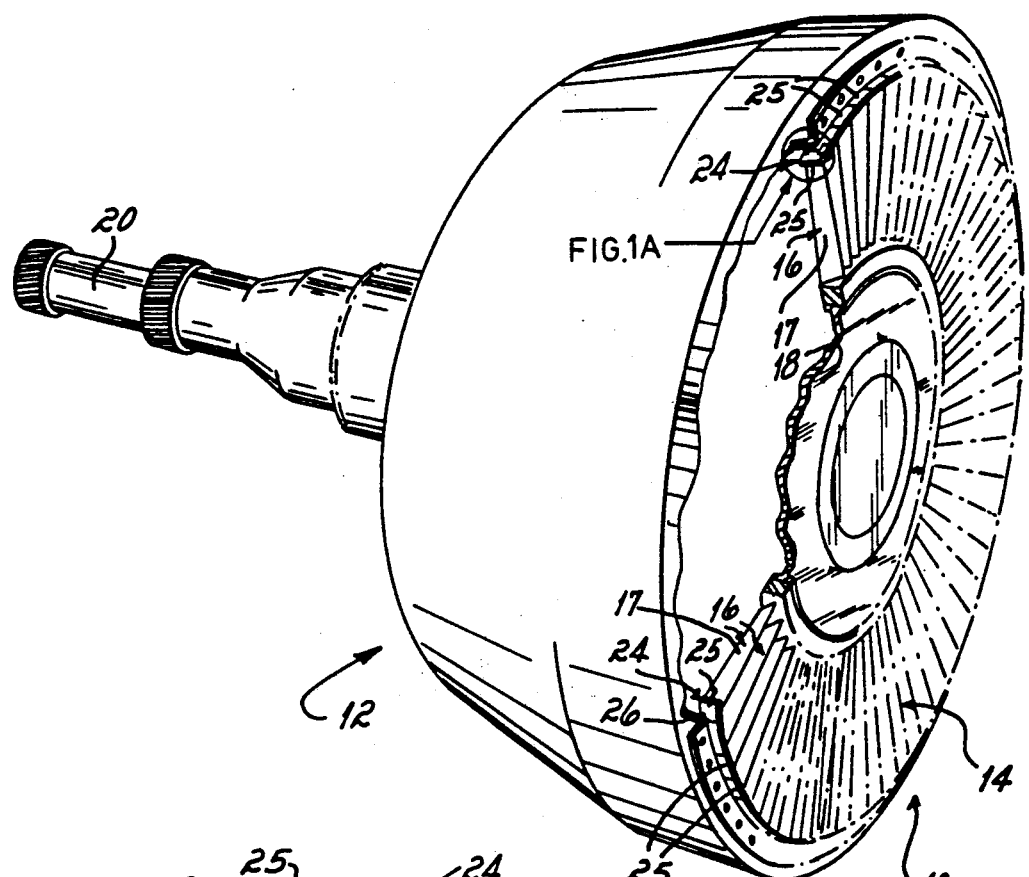
FIG. 1 is a schematic, perspective view of a portion of the rotor in the low pressure stage of the turbine of a jet engine.

Referring now to FIG. 1, a perspective view is provided of a portion of the low pressure stage 10 of a turbine 12 of a jet engine including a turbine rotor 14 which comprises a circumferentially extending row of turbine rotor blades 16, a turbine disk 18 carried on a low pressure turbine shaft 20 and a rotor shroud 24. Each rotor blade 16 has a root which mounts to the circumference of the turbine disk 18 and an airfoil 17 extending radially outwardly from the root. The airfoil 17 of each rotor blade 16 terminates with a segment or tip shroud 25, and these individual tip shrouds 25 are positioned side-by-side along the circumference of the rotor 14 to form the rotor shroud 24.

This invention is directed to a balance clip 28 adapted for attachment to the shroud 24 of the rotor 14 to balance the rotor 14 and thus reduce vibration and noise in the turbine 12 at all operational speeds. The number and position of balance clips 28 required along the shroud 24 to balance the rotor 14 is determined by conventional balancing measurements which form no part of this invention per se and are thus not described herein.

Figure 1A:
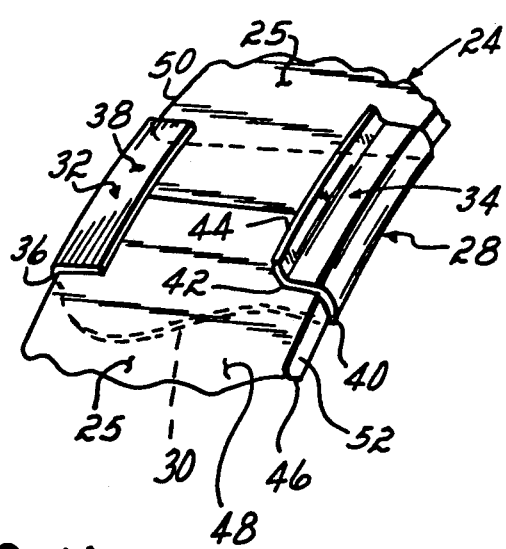
FIG. 1A is an enlarged view of the encircled area of FIG. 1 showing a balance clip installed on the shroud of the rotor.
Figure 2A:
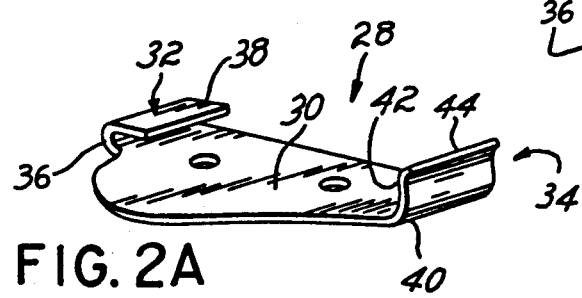
FIG. 2A is a perspective view of the balance clip wherein the portion which is removed is a round hole.
Figure 2:
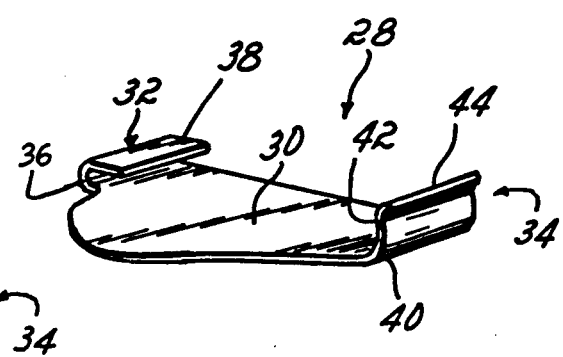
FIG. 2 is a perspective view of the balance clip herein prior to installation.

As shown in FIGS. 1A and 2, the balance clip 28 comprises a clip body 30 having a forward end formed with a forward tab or hook 32 and an opposed, aft end formed with an aft tab 34. As used herein, the terms "forward" and "aft" are related to the orientation of the turbine 12 and refer to the left and right hand directions, respectively, as viewed in FIG. 1. The forward hook 32 is generally U-shaped defining a forward, curved bend 36 and an outer leg 38 which extends substantially parallel to the plane of clip body 30. The aft tab 34 extends generally perpendicular to the clip body 30 and resembles a sinusoid in shape having a first bend 40 nearest the surface of the clip body 30 which extends in an aft direction, and a second bend 42 spaced from the first bend 40 which extends in a forward direction. The second bend 42 terminates at the outermost edge 44 of the aft tab 34 and this outermost edge 44 faces in a generally aft direction as viewed in FIG. 2.

In the presently preferred embodiment, the balance clip 28 is formed from a wrought, sheet material such as AMS 5596E/5597B or AMS 5537D. The balance clip 28 has a nominal thickness of approximately 10 millimeters, although this thickness can be varied depending upon the amount of weight required for a given rotor blade 16. Additionally, the weight of balance clip 28 may be altered by varying its width and/or drilling holes in the clip body 30 to remove material therefrom.

Referring now to FIGS. 3-5, the operations for installing the balance clip 28 on the shroud 24 of the turbine rotor 14 are illustrated. As shown in FIGS. 1A and 3-5, the shroud 24 includes an inner face 46, an outer face 48, a forward rail 50 at one end and an aft rail 52 at the opposite end.

Initially, the forward hook 32 of balance clip 28 is placed onto the forward rail 50 of the shroud 24 between adjacent airfoils 17, i.e., the balance clip 28 extends from the tip shroud 25 at the end of one airfoil 17 to the tip shroud 25 at the end of an adjacent airfoil 17. In the preferred embodiment, needlenose pliers, clamp forceps or the like (not shown) are employed to grasp the edges of the clip body 30 and place its forward hook 32 on the forward rail 50 of shroud 24. A force illustrated schematically as an arrow 54 is then applied to the clip body 30 by a screwdriver of the like (not shown) which pushes the clip body 30 against the inner face 46 of shroud 24. In the course of pushing the clip body 30 against the shroud 24, the aft tab 34 of the balance clip 28 is deflected or sprung in an aft direction by the aft rail 52 of shroud 24 so that the balance clip 28 snap fits onto the shroud 24. This retains the balance clip 28 in place on the shroud 24 in preparation for the next step in the installation operation.

As shown in FIG. 4, an installation tool 56 is employed in the next step of the clip mounting operation. The installation tool 56 is a modified channel lock tool having a first jaw 58 formed with a recess 60 adapted to engage the forward hook 32, and a second jaw 62 formed with a recess 64 adapted to engage the aft tab 34. With the jaws 58, 62 in an open position as shown in FIG. 4, the forward hook 32 of balance clip 28 is received within the recess 60 of first jaw 58, and the aft tab 34 is in a position to abut the edge of second jaw 62 of tool 56.

In order to affix the balance clip 28 to the shroud 24, the jaws 58, 62 are moved together by operation of the tool handles 63 so that the aft tab 34 is received within the recess 64 of second jaw 62 and crimped over the aft rail 52 of shroud 24 onto its outer face 48. As illustrated in FIG. 5, the aft tab 34 in its crimped position extends substantially parallel to the plane of the clip body 30 except for the outermost edge 44 of aft tab 34 which is spaced from the outer face 48 of the shroud 24. The gap or space between the edge 44 of aft tab 34 and the shroud 24 is caused by the second bend 42 formed in aft tab 34 which lies atop the outer face 48 of shroud 24 with the aft tab 34 in its crimped position.

Referring now to FIGS. 6 and 7, the operation for removing the balance clip 28 from the shroud 24 is illustrated. A removal tool 66 is employed for this purpose having a first jaw 68 formed with a tip 70 and a cam surface 72, and a second jaw 74 formed with a tip 76 and a cam surface 78. The cam surfaces 72, 78 of jaws 68, 74, respectively, diverge relative to one another from their tips 70, 76 to an internal slot or space 80 between the jaws 68, 74.

In order to remove the balance clip 28, the removal tool 66 is positioned atop the outer face 48 of shroud 24 such that the tips 70, 76 of the tool 66 are located in the gap between the outermost edge 44 of the aft tab 34 and the shroud 24. The jaws 68, 74 are movable from the open position shown in FIG. 6 to a closed position shown in FIG. 7, and this movement causes the balance clip 28 to ride upwardly on the cam surfaces 72, 78 of the jaws 68, 74. Movement of the aft tab 34 along the cam surfaces 72, 78 continues until the aft tab 34 reaches the space 80 between the jaws 68, 74 at which point the aft tab 34 is in a substantially upright position relative to the outer face 48 of shroud 24. A standard pair of pliers or similar tool is then employed to grasp the aft tab 34 and remove the balance clip 28 from shroud 24.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

For example, the balance clip 28 herein is constructed to mount onto the shroud 24 of the rotor 14 between adjacent airfoils 17 so that the balance clip 28 spans the break or space formed between the tip shrouds 25 of the two, adjacent airfoils 17. It is contemplated that the balance clip 28 could be modified, e.g., by forming slots therein, for mounting to the tip shroud 25 of a single rotor blade 16.

Additionally, the Figs. herein illustrate the balance clip being mounted to the shroud of a rotor at the rotor buildup stage. It should be understood, however, that the balance clip can be attached to the shroud of the rotor after complete buildup of the turbine, or after the turbine is mounted in the jet engine or after the jet engine is mounted on the wing of an aircraft. Moreover, no disassembly of the aft end of the engine is required to install the balance clip herein.

I claim:

1. A system for balancing a rotor in the low pressure stage of a turbine, the rotor having a shroud formed with a forward rail, an aft rail, an inner face and an outer face, comprising:

a balance clip, including:
  (i) a clip body having a forward end and an aft end, said clip body being adapted to engage the inner face of the shroud;
  (ii) a forward hook formed on said forward end of said clip body, said forward hook being adapted to fit onto the forward rail of the shroud;
  (iii) an aft tab formed on said aft end of said clip body, said aft tab being adapted to engage the aft rail of the shroud;
crimping means engageable with said forward hook and said aft tab of said balance clip for bending said aft tab between a first position wherein said aft tab is oriented at an acute angle relative to said clip body and a second, crimped position wherein said aft tab is oriented substantially parallel to said clip body, said aft tab in said second, crimped position being effective to clamp the shroud between said clip body and said aft tab.

2. The system for balancing a rotor of claim 1 in which said crimping means comprises a channel lock tool having a pair of opposed jaws, one of said jaws being formed with a recess which mates with said forward hook of said clip body and the other of said jaws being formed with a recess which mates with said aft tab of said clip body.

3. The system for balancing a rotor of claim 1 in which said aft tab is formed in a sinusoidal shape defining a first bend nearest said clip body and a second bend spaced from said first bend, said second bend terminating at an outermost edge of said aft tab which extends at an acute angle relative to said clip body with said aft tab in said second position forming a space between said outermost edge of said aft tab and the outer face of the shroud.

4. The system for balancing a rotor of claim 3 further comprising means for returning said aft tab of said balance clip from said second, crimped position to said first position comprising a removal tool having a pair of opposed jaws each formed with a tip and a cam surface, said tip of each said opposed jaws being positionable in said space between said outermost edge of said aft tab and the outer face of the shroud, said jaws being movable toward one another so that said aft tab rides along said cam surfaces thereof and disengages the outer face of the shroud.

5. A balanced rotor of a turbine of a jet engine, comprising:
  a turbine disk, a row of turbine rotor blades extending radially outwardly from the circumference of said turbine disk and a shroud located at the outermost end of said row of turbine rotor blades; and
  a balance means fixedly attached to said shroud for balancing said rotor wherein said balance means includes a means for varying the weight of said balance means.

6. The balanced rotor of claim 5 in which said balance means comprises a sheet metal clip having a clip body formed with opposed tabs adapted to clamp onto said shroud and wherein said balance means includes a means for varying the weight of said clip.

7. The balanced rotor of claim 6 in which said means for varying said clip's weight comprises a portion removed from said body.

8. The balance clip of claim 7 in which said portion removed is a round hole formed in said body.

9. The balance clip of claim 6 in which said means for varying said clip's weight comprises a clip of preselected weight chosen from a plurality of clips having different predetermined weights.

10. A balanced rotor of a turbine of a jet engine comprising:
  a turbine disk, a row of turbine blades extending radially outwardly from the circumference of said turbine disk and a shroud located at the outermost end of said row of turbine rotor blades, said shroud having an inner diameter forming an inner surface and an outer diameter forming an outer surface; and
  a balance means attached to said shroud for balancing said rotor, said balance means including a clip resting on said inner surface of said shroud so that centrifugal force caused by rotation of said rotor forces said clip against said shroud, wherein said clip includes a means for varying the weight of said clip.

11. The balanced rotor of claim 10 in which said means for varying said clip's weight comprises a portion removed from said body.

12. The balance clip of claim 11 in which said portion removed is a round hole formed in said body.

13. The balance clip of claim 10 in which said means for varying said clip's weight comprises a clip of preselected weight chosen from a plurality of clips having different predetermined weights.

14. A clip for balancing a rotor in the low pressure stage of a turbine, the rotor having a shroud formed with a forward rail, an aft rail, an inner face and an outer face, comprising:
  a clip body having a forward end and an aft end, said clip body being adapted to engage the inner face of the shroud of the rotor;
  a forward tab formed on said forward end of said clip body, said forward tab being adapted to engage the forward rail of the shroud;
  an aft tab formed on said aft end of said clip body, said aft tab being adapted to engage the aft rail of the shroud;
  at least one of said forward tab and said aft tab being bendable onto the outer face of the shroud for clamping said clip body in a fixed position on the inner face of said shroud.

15. The clip of claim 14 in which said forward tab is a U-shaped hook adapted to extend over the forward rail of the shroud and onto the outer face thereof.

16. The clip of claim 15 in which said aft tab is spaced from said forward tab on said clip body, said space between said forward tab and aft tab being slightly less than the length of the shroud so that said aft tab is laterally deflected upon engagement with the aft rail of the shroud.

17. A clip for balancing a rotor in the low pressure stage of a turbine, the rotor having a shroud formed with a forward rail, an aft rail, an inner face and an outer face, comprising:
  a clip body having a forward end and an aft end, said clip body being adapted to engage the inner face of the shroud of the rotor;
  a means for varying the weight of said clip associated with said clip body;
  a forward hook formed on said forward end of said clip body, said forward hook being adapted to fit onto the forward rail of the shroud;
  an aft tab formed on said aft end of said clip body, said aft tab being adapted to engage the aft rail of the shroud upon movement of said clip body against the inner face of the shroud;

said aft tab being bendable between a first position wherein said aft tab is oriented at an acute angle relative to said clip body and the outer face of the shroud, and a second position wherein said aft tab is oriented substantially parallel to said clip body and the outer face of the shroud, said aft tab in said second position being adapted to clamp the shroud between said clip body and said aft tab for mounting said clip body to the shroud.

18. The clip of claim 17 in which said aft tab is formed in a sinusoidal shape defining a first bend nearest said clip body and a second bend spaced from said first bend, said second bend terminating at an outermost edge of said aft tab which extends at an acute angle relative to said clip body with said aft tab in said second position forming a space between said outermost edge of said aft tab and the outer face of the shroud.

19. The clip of claim 17 in which said forward hook of said clip body is formed in a U-shape defining a curved bend and an outer leg extending substantially parallel to said clip body.

20. The balance clip of claim 17 in which said means for varying said balance clip's weight comprises a portion removed from said body.

21. The balance clip of claim 20 in which said portion removed is a round hole formed in said body.

22. The balance clip of claim 17 in which said means for varying said balance clip's weight comprises a balance clip of preselected weight chosen from a plurality of balance clips having different predetermined weights.

23. The system for balancing a rotor of claim 17 further comprising a plurality of balance clips of varying predetermined weights wherein said balance clip is chosen from said plurality of balance clips having varying predetermined weights.

24. The method of balancing a rotor in the turbine of a jet engine, comprising:

adjusting the weight of at least one balance clip and attaching said balance clip onto a turbine shroud of said rotor to balance said rotor.

25. The method of balancing a rotor in the low pressure stage of the turbine in a jet engine, comprising:

positioning a forward hook of a balance clip onto a forward rail of a turbine shroud of said rotor, the shroud having an inside diameter and an outside diameter;

pushing the clip body of the balance clip against said inner diameter of said shroud so that an aft tab formed on said balance clip engages an aft rail of said shroud;

crimping said aft tab of said balance clip over said aft rail and onto said outside diameter of said shroud to mount said balance clip to said shroud.

26. The method of claim 25 in which said step of crimping the aft tab comprises:

positioning a tool having first and second jaws relative to the balance clip so that the first jaw engages the forward hook of the balance clip and the second jaw engages the aft tab of the balance clip; and moving the first and second jaws toward one another to crimp the aft tab over the aft rail and onto the outside diameter of the shroud.

27. The method of balancing a rotor in the low pressure stage of a turbine in a jet engine, comprising:

fixedly adjusting the weight of at least one balance clip and attaching said balance clip onto a turbine shroud of a rotor so that the balance clip rests against the inside diameter of the shroud for balancing the rotor.

28. The method of claim 27 in which said step of adjusting the clip's weight comprises removing a portion of the clip.

29. The method of claim 28 in which said portion removed is a round hole formed in said body.

30. The method of claim 27 in which said step of adjusting the clip's weight comprises selecting a clip of preselected weight from a plurality of clips having different predetermined weights.

* * * * *